United States Patent [19]

Blount

[11] 4,382,136

[45] May 3, 1983

[54] PROCESS FOR THE PRODUCTION OF POLYHYDROXY LIGNIN-CELLULOSE SILICATE POLYMER

[76] Inventor: David H. Blount, San Diego, Calif.

[21] Appl. No.: 372,298

[22] Filed: Apr. 27, 1982

Related U.S. Application Data

[63] Continuation-in-part of Ser. No. 306,184, Sep. 28, 1981, Pat. No. 4,367,326, which is a continuation-in-part of Ser. No. 257,126, Apr. 24, 1981, Pat. No. 4,313,857, which is a continuation-in-part of Ser. No. 203,730, Nov. 3, 1980, Pat. No. 4,243,757, which is a continuation-in-part of Ser. No. 112,290, Jan. 15, 1980, which is a continuation-in-part of Ser. No. 29,282, Apr. 12, 1979, Pat. No. 4,220,757.

[51] Int. Cl.³ ............................................... C08L 1/00
[52] U.S. Cl. ............................... 527/305; 521/151; 521/154; 524/733; 524/735; 527/105; 527/300; 527/301; 527/303; 527/311
[58] Field of Search ................ 521/151, 154; 524/733, 524/735; 527/105, 300, 301, 305, 311, 303

[56] References Cited

U.S. PATENT DOCUMENTS

| | | | |
|---|---|---|---|
| 4,260,696 | 4/1981 | Blount | 521/154 |
| 4,281,110 | 7/1981 | Blount | 521/154 |
| 4,283,311 | 8/1981 | Blount | 521/154 |
| 4,313,857 | 2/1982 | Blount | 528/44 |

Primary Examiner—Morton Foelak

[57] ABSTRACT

An alkali metal broken-down plant silicate polymer is reacted with a Lewis acid and an epoxide compound to produce a polyhydroxy lignin-cellulose polymer which may be reacted with polyisocyanates to produce polyurethane silicate foam and be used for insulation.

10 Claims, No Drawings

PROCESS FOR THE PRODUCTION OF POLYHYDROXY LIGNIN-CELLULOSE SILICATE POLYMER

CROSS-REFERENCE TO RELATED CO-PENDING APPLICATIONS

This application is a continuation-in-part of U.S. patent application, Ser. No. 306,184, filed on Sept. 28, 1981 now U.S. Pat. No. 4,367,326, which is a continuation-in-part of U.S. patent application, Ser. No. 257,126, filed on Apr. 24, 1981 now U.S. Pat. No. 4,313,857, which is a continuation-in-part of U.S. patent application, Ser. No. 203,730, filed on Nov. 3, 1980 now U.S. Pat. No. 4,243,757, which is a continuation-in-part of U.S. patent application, Ser. No. 112,290, filed on Jan. 15, 1980 now pending, which is a continuation-in-part of my U.S. patent application, Ser. No. 029,282, filed on Apr. 12, 1979, now U.S. Pat. No. 4,220,757.

SUMMARY OF THE INVENTION

This invention relates to the production of polyhydroxy lignin-cellulose silicate polymer by chemically reacting an alkali metal broken-down plant silicate polymer with a Lewis acid and an epoxide compound.

The process to produce the broken-down alkali metal plant polymer is outlined in U.S. patent application, Ser. No. 029,202, filed on Apr. 12, 1979, by David H. Blount, M.D., now U.S. Pat. No. 4,220,757, which is incorporated into this application.

The polyhydroxy lignin-cellulose silicate polymer may be used to produce useful resins and foams such as polyurethane resins and foams, polyester lignin-cellulose resins and foams and polyester amide resins and foams which may be used as molding powder, coating agents, thermal- and sound-insulating foams, etc.

The primary object of this invention is to provide a novel process for the production of a polyhydroxy lignin-cellulose silicate polymer. Another object is to produce a novel polyhydroxy lignin-cellulose silicate polymer product. Another object is to produce polyhydroxy lignin-cellulose silicate polymers which will react with polyisocyanate compound to produce useful solid and foamed products. Another object is to produce polyhydroxy lignin-cellulose silicate polymers which will react with polycarboxylic acid and/or polycarboxylic acid anhydrides to produce useful polyester lignin-cellulose silicate resins.

Polyhydroxy lignin-cellulose polymers are produced by mixing and reacting the following components:
(a) broken-down alkali metal plant silicate polymer;
(b) epoxide compound;
(c) Lewis acid.

Component (a)

The broken-down water-soluble alkali metal plant silicate polymer is produced by heating a mixture of 3 parts by weight of a cellulose-containing plant and 1 to 2 parts by weight of an oxidated silicon compound with 2 to 5 parts by weight of a melted alkali metal hydroxide to between 150° C. and 220° C. while agitating for 5 to 60 minutes. The broken-down alkali metal lignin cellulose silicate polymer is soluble in water, alcohols, polyols, and other organic solvents and is a thick liquid above 150° C. and a brown solid below 150° C. The broken-down alkali metal plant silicate polymer has lost a carbon dioxide radical from each molecule and the lignin-cellulose bond appears to be intact. When a plant product (cellulose) with the lignin removed is used in the production of broken-down alkali metal plant silicate polymer, a dark-brown-colored, water-soluble polymer is produced.

Any suitable alkali metal hydroxide may be used to produce broken-down alkali metal plant polymers; sodium hydroxide is preferred. Any suitable cellulose-containing plant or plant product may be used to produce broken-down alkali metal plant polymers such as trees, shrubs, agricultural plants, seaweeds, pulp wood, cotton, decomposed cellulose-containing plants such as humus, peat and certain soft brown coal, etc.

Any suitable oxidated silicon compound may be used in this invention. Suitable oxidated silicon compounds include silica, e.g., hydrated silica, hydrated silica containing Si—H bonds (silicoformic acid), silica sol, silicic acid, silica; alkali metal silicates, e.g., sodium silicate, potassium silicate, lithium silicate, etc., natural silicates with free silicic acid groups and mixtures thereof. Hydrated silica is the preferred oxidated silicon compound.

Component (b)

Any suitable epoxide compound may be used in this invention. Suitable epoxide compounds include, but are not limited to, alkylene oxides, e.g., ethylene oxide, propylene oxide, butylene oxide; epihalohydrins, e.g., epichlorohydrin, epibromohydrin, methyl epichlorohydrin, di-epi-iodohydrin, epifluorohydrin, epiiodohydrin; substituted butylene oxide, e.g., trichlorobutylene oxide; tetrahydrofuran, styrene oxide and mixtures thereof.

Component (c)

Any suitable Lewis acid which will react with alkali metal radical to produce a salt may be used in this invention. A Lewis acid is any electron acceptor relative to other reagents present in the system. A Lewis acid will tend to accept a pair of electrons furnished by an electron donor (or Lewis base) in the process of forming a chemical compound. A "Lewis acid" is defined for the purpose of this invention as any electron-accepting material relative to the polymer to which it is complexed.

Typical Lewis acids are: 2,5-dichlorobenzoquinone; 2,6-dichlorobenzoquinone; chloranil; 1-chloroanthraquinone; anthraquinone-2-carboxylic acid; 1,5-dichloroanthraquinone; 1-chloro-4-nitroanthraquinone; anthraquinone-1,8-disulfonic acid and anthraquinone-2-aldehyde; 4-nitrobenzaldehyde; 2,6-dichlorobenzaldehyde-2; ethoxy-1-naphthalidehyde; organic phosphonic acids such as 4-chloro-3-nitrobenzene-phosphonic acid nitrophenols; 4-nitrophenol; picric acid; acid anhydrides such as, for example, acetic-anhydride, succinic anhydride, maleic anhydride, phthalic anhydride, tetrachlorophthalic anhydride, perylene 3,4,9,10-tetracarboxylic acid and chrysene-2,3,8,9-tetracarboxylic anhydride; dibromo maleic acid anhydride; metal halides of the metals and metalloids of the groups 1B, II through to group VIII of the periodical system, for example: Aluminum chloride, zinc chloride, ferric chloride, tin tetrachloride (stannic chloride), arsenic trichloride, stannous chloride, antimony pentachloride, magnesium chloride, magnesium bromide, calcium bromide, calcium iodide, strontium bromide, chromic bromide, manganous chloride, cobaltous chloride, cobaltic chloride, cupric bromide, ceric chloride, thorium chloride, arsenic tri-iodide; baron halide compounds, for example; Boron trifluoride, and boron trichloride; acetoacetic acid anilide, and acenaphthene quinone-dichloride.

Additional Lewis acids are mineral acids such as the hydrogen halides, sulphuric acid and phosphoric acid; organic carboxylic acids, such as acetic acid and the substitution products thereof, monochloro-acetic acid, di-chloroacetic acid, trichloro-acetic acid, phenylacetic acid, and 6-methylcoumarinylacetic acid (4); maleic acid; cinnamic acid; benzoic acid; 1-(4-dimethyl-aminobenzoyl)-benzene-2-carboxylic acid; phthalic acid; and tetrachlorophthalic acid; alpha-beta-dibromo-beta-formyl-acrylic acid (mucobromic acid); dibromo-maleic acid; 2-bromo-benzoic acid; gallic acid; 3-nitro-2-hydroxyl-1-benzoic acid; 2-nitro-phenoxy-acetic acid; 2-nitro-benzoic acid; 3-nitro-benzoic acid; 4-nitrobenzoic acid; 3-nitro-4-ethoxy-benzoic acid; 3-nitro-4-methoxy-benzoic acid; 4-nitro-1-methyl-benzoic acid; 2-chloro-5-nitro-1-benzoic acid; 3-chloro-6-nitro-1-benzoic acid; 4-chloro-3-nitro-1-benzoic acid; 5-chloro-3-nitro-2-hydroxybenzoic acid; 4-chloro-2-hydroxy-benzoic acid; 2,4-dinitro-1-benzoic acid; 2-bromo-5-nitrobenzoic acid; 4-chlorophenyl-acetic acid, 2-chloro-cinnamic acid; 2-cyano-cinnamic acid; 2,4-dichlorobenzoic acid; 3,5-dinitro-benzoic acid; 3,5-dinitro-salycylic acid; malonic acid; mucic acid, acetosalycylic acid; benzilic acid; butane-tetracarboxylic acid; citric acid; cyanoacetic acid; cyclo-hexane-dicarboxylic acid; cyclo-hexane-carboxylic acid; 9,10-dichlorostearic acid; fumaric acid; itaconic acid; levulinic acid (levulic acid); malic acid; succinic acid; alphabromo-stearic acid; citraconic acid; dibromo-succinic acid; pyrene-2,3,7,8-tetra-carboxylic acid; tartaric acid; organic sulphonic acids such as 4-toluene sulphonic acid and benzene sulphonic acid; 2,4-dinitro-1-methyl-benzene-6-sulphonic acid; 2,6-dinitro-1-hydroxy-benzene-4-sulphonic acid; 2-nitro-1-hydroxy-benzene-4-sulphonic acid; 4-nitro-1-hydroxy-2-benzene-sulphonic acid; 3-nitro-2-methyl-1-hydroxy-benzene-5-sulphonic acid; 6-nitro-4-methyl-1-hydroxy-benzene-2-sulphonic acid; 4-chloro-1-hydroxy-benzene-3-sulphonic acid; 2-chloro-3-nitro-1-methyl-benzene-5-sulphonic acid and 2-chloro-1-methyl-benzene-4-sulphonic acid.

DETAILED DESCRIPTION OF THE INVENTION

The preferred process for producing polyhydroxy lignin-cellulose silicate polymer is to mix 100 parts by weight of broken-down alkali metal plant silicate polymer with 1 to 300 parts by weight of an epoxide compound, then slowly add a Lewis acid while agitating until the pH is about 5 to 6 and keeping the temperature of the mixture below the boiling temperature of the epoxide compound; then the mixture is agitated for 30 minutes to eight hours, thereby producing a polyhydroxy lignin-cellulose silicate polymer.

The reactions of this invention may take place under any suitable physical condition. While most of the reactions will take place at ambient pressure, in certain cases, a pressure either lower than, or above, ambient pressure may give best results. When the epoxide compound is a gas, elevated pressures are necessary. A pressure wherein the epoxide compound is in a liquid form is preferred.

In an alternate method, the Lewis acid may be added and reacted with the broken-down alkali metal plant silicate polymer until the pH is about 5 to 6 when tested in an aqueous solution; then the epoxide compound is added and reacted with the lignin-cellulose silicate polymer. The components may also be added simultaneously.

In another alternate method, an aldehyde compound may be added with the components in an amount of 1 to 100 parts by weight to 100 parts by weight of the broken-down alkali metal plant silicate polymer. The aldehyde may also be first reacted with the broken-down alkali metal plant silicate polymer before Components (b) and (c) are added.

Any suitable aldehyde compound may be reacted with the broken-down alkali metal plant silicate polymer. Suitable aldehydes include, but are not limited to, formaldehyde, acetaldehyde, propionic aldehyde, furfural, crotonaldehyde, acrolein, butyl aldehyde, paraformaldehyde, pentanals, hexanals, heptanals, and mixtures thereof in the ratio of 1 to 100 parts by weight of the aldehyde to 100 parts by weight of the broken-down alkali metal plant silicate polymers. The aldehyde may be mixed with the water-soluble broken-down alkali metal plant silicate polymer, then agitated at a temperature between ambient temperature and the boiling temperature of the aldehyde and at ambient pressure for from 10 to 120 minutes, thereby producing an aldehyde alkali metal lignin-cellulose silicate polymer.

Any suitable salt-forming compound may be used in this invention to react with the broken-down alkali metal lignin-cellulose silicate polymer. Suitable salt-forming compounds include mineral acids such as hydrochloric acid, sulfuric acid and nitric acid, organic acid such as acetic acid, propionic acid, etc., and hydrogen-containing acid salts such as sodium hydrogen sulfate, potassium hydrogen sulfate, sodium dihydrogen phosphate and potassium dihydrogen phosphate, and mixtures thereof.

The polyhydroxy lignin-cellulose silicate polymer will react with polyisocyanates such as crude MDI to produce resinous products which may be used as adhesives, putty caulking agents, etc., and foams which may be used for thermal and sound insulation.

Any suitable organic polyisocyanate may be used according to the invention, including aliphatic, cycloaliphatic, araliphatic, aromatic and heterocyclic polyisocyanates and mixtures thereof. Suitable polyisocyanates which may be employed in the process of the invention are exemplified by the organic diisocyanates which are compounds of the general formula:

$$O=C=N-R-N=C=O$$

wherein R is a divalent organic radical such as an alkylene, aralkylene or arylene radical. Such suitable radicals may contain, for example, 2 to 20 carbon atoms. Examples of such diisocyanates are:
tolylene diisocyanate,
p,p'-diphenylmethane diisocyanate,
phenylene diisocyanate,
m-xylylene diisocyanate,
chlorophenylene diisocyanate,
benzidene diisocyanate,
naphylene diisocyanate,
decamethylene diisocyanate,
hexamethylene diisocyanate,
pentamethylene diisocyanate,
tetramethylene diisocyanate,
thiodipropyl diisocyanate,
propyelene diisocyanate, and
ethylene diisocyanate.

Other polyisocyanates, polyisothiocyanates and their derivatives may be equally employed. Fatty diisocyanates are also suitable and have the general formula:

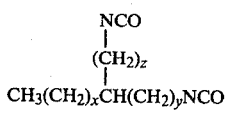

$$\text{CH}_3(\text{CH}_2)_x\text{CH}(\text{CH}_2)_y\text{NCO}$$

where x+y totals 6 to 22 and z is 0 to 2, e.g., isocyanastearyl isocyanate.

It is generally preferred to use commercially readily-available polyisocyanates, e.g., tolylene-2,4- and -2,6-diisocyanate and any mixtures of these isomers, commercially known as "TDI"; polyphenylpolymethylene-isocyanates obtained by aniline-formaldehyde condensation followed by phosgenation, commercially known as "MDI"; and modified polyisocyanate containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates or aniline or anilines alkyl-substituted on the nucleus with formaldehydes or ketones may be used in this invention. Solutions of distillation residues accumulating during the production of tolylene diisocyanates, diphenyl methane diisocyanates, or hexamethylene diisocyanate, in monomeric polyisocycantes or in organic solvents, or mixtures thereof may be used in this invention. Organic triisocyanates such as triphenylmethane triisocyanate may be used in this invention. Cycloaliphatic polyisocyanates, e.g., cyclohexylene-1,2-; cyclohexylene-1,4-; and methylene-bis-(cyclohexyl-4,4'-)diisocyanate may be used in this invention. Suitable polyisocyanates which may be used according to the invention are described by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethane prepolymers and then also be used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from 800 to about 10,000 and, preferably, from about 1,000 to about 6,000, e.g., polyesters, polyethers, polythioethers, polyacetals, polycarbonates or polyester amides containing at least 2, generally from 2 to 8, but, preferably, dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated. Examples include: Succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used, such as, for example, ethylene glycol, propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetra ethylene glycol; polyethylene glycols; dipropylene glycol; polypropylene glycols; dibutylene glycol and polybutylene glycols. The polyesters may also contain a proportion of carboxyl end groups. Polyesters of lactones such as c-caprolactone, or hydroxycarboxylic acid such as c-hydroxycaproic acid may also be used.

The polyethers with at least 2, generally from 2 to 8 and, preferably, 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$ or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenylpropane; aniline; ammonia, ethanolamine or ethylene-diamine; sucrose polyethers, such as those described in German Auslegeschrifren Nos. 1,176,358 and 1,064,938, may also be used according to the invention. It is frequently preferred to use polyethers which contain, predominantly, primarily OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,100,695; and German Pat. No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythiomixed ethers or polythioethers ester amides, depending on the cocomponent.

The polyacetals used may be, for example, the compounds which may be obtained from glycols, 4,4'-dihydroxydiphenylmethylmethane, hexanediol and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, wood particles, cellulose, modified cellulose, carbohydrates and starches, may also be used. Additional products of alkylene oxides with phenol formaldehyde resins or with urea-formaldehyde resins are also suitable for the purpose of the invention.

Organic hydroxyl silicate compound as produced in U.S. Pat. No. 4,139,549 may also be used in this invention to react with the polyisocyanates.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich 1966, on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polyisocyanate curing agents and/or polyisocyanate activators (catalysts) may be used in the process of producing polyurethane resinous or foamed products. The following are examples of polyisocyanate curing agents and activators:

1. Water.
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates may also be used. The molar ratio of alkali metal oxide to $SiO_2$ is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate such as sodium metasilicate, potassium metasilicate and commercial dry granular sodium and potassium silicates. Heating may be required to start the curing reaction.
6. Water containing 20% to 70% by weight of silica sol.
7. Activators (catalysts) which act as curing agents and are added to the polyurethane or polyurethane prepolymer in the amount of 0.001% to 10% by weight. They may be added in water.
   (a) Tertiary amines, e.g., triethylamine; tributylamine; N-methyl-morpholine; N,N,N',N'-tetramethylenediamine; 1,4-diazobicyclo-(2,2,2)-octane; N-methyl-N'-dimethylaminoethyl piperazine; N,N-dimethylbenzylamine; bis(N,N-diethylaminoethyl)-adepate; N,N-diethylbenzylamine; pentamethyldiethylenetriamine; N,N-dimethylcyclohexylamine; N,N,N',N'-tetramethyl-1,3-butanediamine; N,N-dimethyl-beta-phenylethylamine; and 1,2-dimethylimidazole. Suitable tertiary amine activators which contain hydrogen atoms which are reactive with isocyanate groups include, e.g., triethanolamine; triisopanolamine; N,N-dimethylethanolamine; N-methyldiethanolamine; N-ethyldiethanolamine; and their reactive products with alkylene oxides, e.g., propylene oxides and/or ethylene oxide and mixtures thereof.
   (b) Organo-metallic compounds, preferably organotin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.
   (c) Silaamines with carbon-silicon bonds are described, e.g., in British Pat. No. 1,090,589, may also be used as activators, e.g., 2,2,4-trimethyl-1,2-silamorpholine or 1,3-diethylaminoethyl-tetramethyldisiloxane.
   (d) Other examples of catalysts which may be used according to the invention, and details of their action are described in Kunststoff-Handbuch, Volume VII, published by Vieweg and Hochtlen, Carl-Hanser-Verlag, Munich, 1966, on pages 96 and 102.
8. Water containing 1% to 10% by weight of bases which contain nitrogen such as tetraalkyl ammonium hydroxides.
9. Water containing 1% to 10% by weight of alkali metal hydroxides such as sodium hydroxide; alkali metal phenolates such as sodium phenolate or alkali metal alcoholates such as sodium methylate.
10. Water containing sodium polysulfide in the amount of 1% to 10% by weight.
11. Water containing 20% to 70% by weight of a water-binding agent, being capable of absorbing water to form a solid or a gel, such as hydraulic cement, synthetic anhydrite, gypsum or burnt lime.
12. Mixtures of the above-named curing agents.

Surface-active additives (emulsifiers and foam stabilizers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid, or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308. These additives are, preferably, used in quantities of up to 20%, based on the reaction mixture.

Negative catalyst, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g., tris-chloroethylphosphate or ammonium phosphate and polyphosphates, stabilizers against aging and weathering, plasticizers, fungicidal and bacteriocidal substances and fillers, e.g., barium sulphate, kieselguhr, carbon black or whiting, may also be used according to the invention.

Further examples of surface additives, foam stabilizers, cell regulators, negative catalysts, stabilizers, flame-retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich, 1966, on pages 103 to 113. The halogenated paraffins and inorganic salts of phosphoric acid are the preferred fire-retarding agents.

Aqueous solutions of silicates may be prepared in the form of 25% to 70% silicates. Silica sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are, preferably, produced with concentrated silicated solutions which, if necessary, are adjusted to a lower viscosity by addition of alkali metal hydroxide. Solutions with concentrations of 40% to 70% by weight can be prepared in this way. On the other hand, to produce open-celled, light-weight foams, it is preferred to use silicate solutions with concentrations of 25% to 45% by weight in order to obtain lower viscosities, sufficiently long reaction times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorus, e.g., tributylphosphate, tris(2,3-dichloropropyl)-phosphate; polyoxypropylenechloromethylphosphonate; cresyldiphenylphosphate; tricresylphosphate; tris-(betachloroethyl)-phosphate; tris-(2,3-dichloropropyl)-phosphate; triphenylphosphate; ammonium phosphate; perchlorinated diphenyl phosphate; perchlorinated terephenyl phosphate; hexabromocyclodecane; tribromophenol; dibromopropyldiene; hexabromobenzene; octabromodiphenylether; pentabromotoluol; polytribromostyrol; tris-(bromocresyl)-phosphate; tetrabromobisphenol A; tetrabromphthalic acid anhydride; octabromodiphenyl phophate; tri-(dibromopropyl)-phosphate; calcium hydrogen phosphate; sodium or potassium dihydrogen phosphate; disodium or dipotassium hydrogenphosphate; ammonium chloride, phosphoric acid; polyvinylchloride tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing components are, however, preferred in the polyurethane products.

The rations of the essential reactants and optional reactants which lead to the polyurethane resinous or foamed product of this invention may vary, broadly speaking, with ranges as follows:

(a) 100 parts by weight of polyhydroxy lignin-cellulose polymer polyester resinous product;

(b) 1 to 600 parts by weight of polyisocyanate, polyisothiocyanate or isocyanate-terminated polyurethane prepolymer;

(c) up to 20% by weight of a foam stabilizer;

(d) up to 50% by weight of a chemically inert blowing agent, boiling within the range of from −25° C. to 80° C.;

(e) up to 10% by weight of an activator;

(f) up to 200% by weight of a water-binding agent;

(g) up to 95% by weight of a polyol;

(h) up to 100% by weight of a curing agent;

(i) up to 5% by weight of an emulsifying agent.

Percentages are based on the weight of the reactants, polyhydroxy lignin-cellulose polymer, polyol and polyisocyanate.

In the cases where the viscosity of the polyisocyanate is too high, it may be reduced by adding a low-viscosity isocyanate, or even by adding inert solvents such as acetone, diethyl ether of diethylene glycol, ethyl acetate and the like.

In cases where the curing agent contains an aqueous alkali silicate, the isocyanate-terminated polyurethane prepolymer may be sulphonated. It is usually sufficient to react with isocyanate-terminated polyurethane prepolymer with concentrated sulphuric acid or oleum of sulfur trioxide in order to produce a sulphonated poly-(urethane silicate) prepolymer containing the sulphonic group in the amount of 3 to 100 milli-equivalents/100 g. The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyester resinous products.

The sulphonated isocyanate-terminated polyurethane prepolymer can be directly mixed with an aqueous silicate solution, in which case the corresponding metal salt is formed in situ. The sulphonated polyurethane prepolymer may be completely or partly neutralized at the onset by the addition of amines, metal alcoholates, metal oxides, metal hydroxide or metal carbonates.

Water-binding components may be used in this invention, including organic or inorganic water-binding substances which have, first, the ability to chemically combine, preferably irreversibly, with water, and second, the ability to reinforce the poly(urethane silicate) plastics of the invention. The term "water-binding component" is used herein to identify a material, preferably granular or particulate, which is sufficiently anhydrous to be capable of absorbing water to form a solid or gel such as mortar of hydraulic cement.

A water-binding component such as hydraulic cement, synthetic anhydrides, gypsum or burnt lime may be added to any of the components to produce a tough, somewhat flexible solid or cellular solid concrete. The water-binding component may be added in amounts from 0 to 200% by weight, based on the weight of the reactants. When a water-binding agent is added and when the curing agent is an aqueous alkali metal silicate solution, a halogen- or phosphorus-containing compound or mixture thereof may be added in the amount of 1% to 30% by weight, based on the weight of the reactants.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, published by Kirk-Othmer, pages 684 to 710, of the type of cement which may be used in the production of this invention and which are incorporated herein by reference.

Blowing agents may be used to improve or increase the foaming to produce cellular solid plastics such as acetone, ethyl acetate, methanol, ethanol, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, azoisobutyric acid nitrile, may also act as blowing agents. Compressed air may act as a blowing agent. Other examples of blowing agents and details of the use of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510.

The proportions of the components may be adjusted to a highly cellular solid. When water is used, it reacts with the NCO group to produce $CO_2$ and pores are produced in the product by the evolved $CO_2$. In certain cases, the $CO_2$ is rapidly evolved and escapes before the product hardens and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with copolymer or polyol or be reacted with the polyisocyanate to produce a polyurethane prepolymer. In that case, the function of the polyisocyanate is that of a non-volatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compressed air may be mixed in the components and may also be used to mix the components, then be used as the blowing agent. These metal powders also have a hardening and reinforcing effect.

The properties of the foams (cellular solid) obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 12 times their original volume.

The polyurethane silicate plastics produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and mixture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues the foaming until the reaction is complete. A temperature between 40° C. and 150° C. may be required in order to initiate foaming. The blowing agent may be added to the polyisocyanate or polyhydroxy lignin-cellulose silicate polymer.

Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, these sandwich elements may be foamed. The products may be used as hollow bodies, e.g., as containers for goods which may be required to be kept moist or cool, as filter materials or exchanges, as catalyst carriers or as carriers of other active substances, as decorative elements, furniture components and fillings or for cavities. They may be used in the field of model building and mold building, and the production of molds for metal casting may also be considered.

Instead of blowing agents, finely divided inorganic or organic hollow particles, e.g., hollow expanded beads of glass, plastics and straw, may be used for producing cellular solid products. These products may be used as insulating materials, cavity fillings, packaging materials, building materials which have good solvent resistance and advantageous fire-resistant characteristics. They may also be used as lightweight building bricks in the form of sandwiches, e.g., with metal-covering layers for house building and the construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyuethane, poly(urethane silicate) copolymers, urea-formaldehyde, phenol-formaldehyde or polyimide polymers, or, alternatively, heaps of these particles may be permeated with foaming reaction mixtures to produce insulation materials which have good fire-resistant characteristics.

The cellular solid poducts of the invention, in the aqueous or dry or impregnated state, may subsequently be lacquered, metallized, coated, laminated, galvanized, vapor-treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness, yet they are still elastic. They are resistant to tension and compression and have a high-dimensional stability to heat and high flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used as a filler, as a soil conditioner, as a substrate for the propagation of seedlings, cuttings and plants or cut flowers.

The foamed or solid concrete produced by reaction of the organic broken-down lignin-cellulose polymer, polyol and polyisocyanate with a water-binding component may be used as surface coatings having good adhesion and resistance-to-abrasion properties, as mortars, and for making molded products, particularly in construction engineering and civil engineering such as for building walls, igloos, boats and for roadbuilding, etc. These products are light-weight, thermal-insulating materials with excellent mechanical properties and fire resistance. The amount of water-binding component used varies greatly, depending on the type of product desired, up to 200% by weight, based on weight of reactants. In certain cases, it is desirable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumb-bell shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, aluminosilicates, cements, basalt wool or powder, glass fibers, carbon fibers, graphite, carbon black, Al—, Fe—, Cri— and Ag-powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers, may be added to the mixture of the Components in many applications. Among the numerous organic polymers which may be used, e.g., as powders, granules, foam particles, beads, hollow beads, foamable (but not-yet-foamed) particles, fibers, tapes, woven fabrics, or fleeces, the following may be mentioned as examples: Polystyrene, polyethylene, polypropylene, polyacrylonitrile, polybutadiene, polyisoprene, polytetrafluorethylene, aliphatic and aromatic polyesters, melamine, urea, phenol resins, phenol silicate resins, polyacetal resins, and foils may be used for producing synthetic incombustible paper or fleeces.

When the polyhydroxy lignin-cellulose silicate polymer, produced by the process of this invention, and polyisocyanate are combined with expanded clay and an alkali metal silicate solution, a very good concrete is obtained which can, for example, be used as panels in the construction field. In this case, the foam material (expanded clay) plays the part of the binding material.

The polyhydroxy lignin-cellulose silicate polymer may be reacted with a polycarboxylic acid and/or a polycarboxylic acid anhydride to produce a polyester lignin-cellulose silicate resin.

The preferred method for producing lignin-cellulose resin is to mix 100 parts by weight of the polyhydroxy lignin-cellulose silicate polymer with 1 to 50 parts by weight of a polycarboxylic acid and/or polycarboxylic acid anhydride, then heat the mixture to just below the boiling temperature of the polycarboxylic acid and/or polycarboxylic acid anhydride while agitating, then gradually increasing the temperature to 250° C. while agitating for from 30 minutes to 4 hours, thereby producing a polyester lignin-cellulose silicate resin.

The polycarboxylic acid and its anhydride may be aliphatic cycloaliphatic, aromatic and/or heterocyclic and may be substituted, e.g., with halogen atoms and may be unsaturated; examples include: Succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid and maleic acid anhydride and mixtures thereof. Dimeric and trimeric acid, fatty acid such as oleic acid, optionally mixed with monomeric fatty acids, dimethylterephthalate and bis-glycol terephthalate may also be used.

Long-chain unsaturated polyester resins may be made from dibasic acids and dihydric alcohols. Either the dibasic acid or the dihydric alcohol may be unsaturated. Usually a combination of unsaturated or saturated dibasic acids and dihydric alcohols is used to produce the unsaturated polyester resins. Instead of the dibasic acids, the corresponding polycarboxylic acid ester of lower alcohols or their mixtures may be used for preparing the unsaturated polyester resins. An unsaturated dibasic acid such as maleic acid, maleic acid anhydride, fumaric acid, itaconic acid or mixtures thereof may be included in the production of unsaturated polyester resins, except when an unsaturated alcohol is used.

A portion, up to 50% by weight, of the polycarboxylic acid and/or polycarboxylic acid anhydride may be replaced by polymerable oils such as unsaturated fatty acids (or their esters), tung oil, linseed oil, heated linseed oil, soybean oil, dehydrated castor oil, tall oil, cottonseed oil, sunflower oil, fish oil, perilla oil, safflower oil and mixtures thereof.

A portion, up to 50% by weight, of the polycarboxylic acid and/or polycarboxylic acid anhydride may be replaced with a linear organic carbonate selected from the group consisting of p-xylene glycol bis(ethyl carbonate), diethylene glycol bis(allyl carbonate) and mixtures thereof.

A portion, up to 50% by weight, of the substituted organic monohydroxy compound and polycarboxylic acid is replaced with an organic compound containing hydroxyl and carboxylic radicals, selected from the group consisting of 10-hydroxy undecanoic acid, 2-hydroxy decanoic acid, ω-hydroxy pentadecanoic acid and mixtures thereof.

DESCRIPTION OF PREFERRED EMBODIMENTS

My invention will be illustrated in greater detail in the specific Examples which follow, which detail the preferred embodiments of my process. It should be understood that the scope of my invention is not limited to the specific processes set out in the Examples. Parts and percentages are by weight, unless otherwise indicated.

EXAMPLE 1

About 2 parts by weight of melted lye flakes (NaOH), 1 part by weight of polysilicic acid, and 2 parts by weight of fir sawdust are mixed, then heated to between 150° C. and 220° C. while agitating at ambient pressure, with care being taken that the mixture does not burn, for 5 to 60 minutes or until the mixture softens and expands into a dark-brown, thick liquid when hot. It cools to a solid, thereby producing a broken-down alkali metal plant silicate polymer which is water-soluble.

Other plant particles may be used in place of fir sawdust such as:

| | |
|---|---|
| (a) oak sawdust; | (g) bagasse; |
| (b) ash sawdust; | (h) paper; |
| (c) seaweed; | (i) oat straw; |
| (d) cotton; | (j) grass clippings; |
| (e) corn cobs; | (k) pine sawdust; |
| (f) cotton stalks; | (l) equal parts of paper and fir sawdust. |

EXAMPLE 2

About equal parts by weight of melted sodium hydroxide, sodium metasilicate and a plant particle listed below are mixed at between 150° C. and 220° C. while agitating at ambient pressure for 5 to 60 minutes or until the mixture softens and expands into a thick brown liquid which solidifies on cooling, thereby producing a broken-down alkali metal plant silicate polymer. The polymer is ground into small particles.

| | |
|---|---|
| (a) fir sawdust; | (i) equal mixtures of (a) and newspapers; |
| (b) oak sawdust; | (j) equal mixtures of (c) and cotton; |
| (c) beech sawdust; | |
| (d) redwood sawdust; | (k) pine sawdust; |
| (e) gum sawdust; | (l) maple sawdust; |
| (f) sycamore sawdust | (m) elm sawdust; |
| (g) cotton stalk particles; | (n) corn cob particles; |
| (h) mixture of weed particles; | (o) seaweed particles; |
| | (p) cornstalk particles; |
| | (q) bagasse particles; |
| | (r) mixtures thereof. |

EXAMPLE 3

About equal parts by weight of potassium hydroxide, potassium silicate and a plant particle selected from the list below are mixed, then heated to between 150° C. and 220° C. while agitating at ambient pressure for 5 to 60 minutes or until the mixture softens and expands into a dark-brown, thick liquid, thereby producing a broken-down alkali metal plant silicate polymer. The polymer is ground into small particles.

| | |
|---|---|
| (a) fir sawdust; | (g) rice straw particles; |
| (b) pine sawdust; | (h) wheat straw particles; |
| (c) seaweed particles; | (i) bagasse particles; |
| (d) corn cob particles; | (j) oak sawdust; |
| (e) corn stalk particles; | (k) gum sawdust; |
| (f) ash sawdust; | (l) cedar sawdust. |

EXAMPLE 4

About 4 parts by weight of the broken-down alkali metal plant silicate polymer as produced in Example 2(b) and 4 parts by weight of propylene oxide are mixed, then 6 N hydrochloric acid is slowly added until the pH is about 5 to 6 while agitating and keeping the temperature below the boiling point of propylene oxide; then the mixture is agitated from 30 minutes to 2 hours, thereby producing a polyhydroxy lignin-cellulose silicate polymer and sodium chloride.

EXAMPLE 5

About 100 parts by weight of the broken-down alkali metal plant silicate polymer as produced in Example 3(a) are mixed with 50 parts by weight of epichlorohydrin, then 6 N phosphoric acid is slowly added while agitating and keeping the temperature below the boiling temperature of epichlorohydrin until the pH is about 5 to 6. The mixture is then agitated for between 30 minutes and 2 hours at ambient pressure, thereby producing a polyhydroxy lignin-cellulose silicate polymer and sodium phosphate.

EXAMPLE 6

About 100 parts by weight of the broken-down alkali metal plant silicate polymer as produced in Example 2(b) are added to an autoclave; then 6 N phosphoric acid is added until the pH is about 5 to 6; then 50 parts by weight of ethylene oxide are slowly added while agitating at 50 psi for from 30 minutes to 8 hours, thereby producing a polyhydroxy lignin-cellulose silicate polymer.

Other Lewis acids may be used with the phosphoric acid, such as BF$_3$, acetic anhydride, aluminum chloride, monochloro-acetic acid, phthalic acid, 4-chloro-2-hydroxy-benzoic acid, benzene sulphonic acid and stannic chloride.

EXAMPLE 7

About 100 parts by weight of the broken-down alkali metal plant silicate polymer as produced in Example 1(l) are added to an autoclave, then 6 N sulfuric acid is added while agitating until the pH is about 5 to 6; then 50 parts by weight of propylene oxide and 50 parts by weight of ethylene oxide are slowly added at 50 psi while agitating for from 30 minutes to 8 hours; thereby producing a polyhydroxy lignin-cellulose silicate polymer.

EXAMPLE 8

About 100 parts by weight of the broken-down alkali metal plant silicate polymer as produced in Example 1(k), 100 parts by weight of propylene oxide and 50 parts by weight of tetrahydrofuran are mixed, then 6 N hydrochloric acid is slowly added while agitating and keeping the temperature below the boiling temperature of propylene oxide until the pH is about 5 to 6. The mixture is agitated from 30 minutes to 8 hours, thereby producing a polyhydroxy lignin-cellulose silicate polymer and sodium chloride.

EXAMPLE 9

About 100 parts by weight of the broken-down metal plant silicate polymer as produced in Example 1(b), 300 parts by weight of propylene oxide and 1 part by weight of $BF_3$ are mixed, then chloroacetic acid is slowly added while agitating and keeping the temperature below the boiling temperature of propylene oxide until the pH is about 5 to 6. The mixture is agitated at ambient pressure for 30 minutes to 8 hours, thereby producing a polyhydroxy lignin-cellulose silicate polymer and salt. The salt and unreacted plant polymer are removed by decantation and filtration.

EXAMPLE 10

About 50 parts by weight of the broken-down alkali metal plant silicate polymer as produced in Example 1(d), 50 parts by weight of the broken-down alkali metal plant silicate polymer as produced in Example 1(a), 100 parts by weight of styrene oxide, 100 parts by weight of propylene oxide and 50 parts by weight of trichlorobutylene oxide are mixed; then concentrated phosphoric acid is slowly added while agitating and keeping the temperature below the boiling temperature of propylene oxide until the pH is about 5 to 6. The mixture is agitated for from 30 minutes to 8 hours, thereby producing a polyhydroxy lignin-cellulose silicate polymer.

EXAMPLE 11

About equal parts by weight of tolylene diisocyanate and the polyhydroxy lignin-cellulose silicate polymer as produced in Example 1 are mixed. The mixture slowly solidifies into a tough solid polyurethane silicate resin.

EXAMPLE 12

Example 11 is modified by adding about 10% trichlorotrifluoroethane, 1% by weight of sodium sulfosuccinate, 0.5% by weight of triethyldiamine, 0.1% by weight of tin octoate and 1% by weight of a polymethylsiloxane silicate, percentage based on the reaction mixture, thereby producing a foamed polyurethane silicate resin.

EXAMPLE 13

About 55 parts by weight of the polyhydroxy lignin-cellulose silicate polymer as produced in Example 2, 0.5 part by weight of triethanolamine, 0.1 part by weight of tin octate and 50 parts by weight of a compound containing an isocyanate listed below are mixed and the mixture slowly solidifies into a tough, solid polyurethane silicate resin.

| Example | Polyisocyanate compound |
|---|---|
| a | Polyphenylpolymethyleneisocyanate with an NCO content of about 31%; |
| b | 2,6-toluene diisocyanate; |
| c | Methylene bis-phenyl diisocyanate; |
| d | Tolylene diisocyanate reacted with 5% propylene glycol; |
| e | Crude toluene diisocyanate with an NCO content of about 18%; |
| f | Equal parts by weight of crude toluene diisocyanate with an NCO content of about 18 and polyphenylpolymethylene-isocyanates with an NCO content of about 31; |
| g | Methylene bis-phenyl diisocyanate reacted with a liquid polyepichlorohydrin to produce a prepolymer containing about 16% NCO and 25% by weight of a resin extender, polyalphamethylstyrene added; |
| h | Naphthalene-15-diisocyanate; |
| i | Hexylene-1,6-diisocyanate. |

EXAMPLE 14

Example 13 is modified wherein 10 parts by weight of trichlorofluoromethane and 1 part by weight of a foam stabilizer (water-soluble polyester siloxane) are added with the triethanolamine, thereby producing a rigid foamed polyurethane silicate product.

EXAMPLE 15

About 5 parts by weight of the polyhydroxy lignin-cellulose silicate polymer and 100 parts by weight of polyphenylpolymethyl-isocyanates with an NCO content of about 31 are thoroughly mixed and slowly reacted to produce an isocyanate-terminated polyurethane silicate prepolymer.

EXAMPLE 16

The isocyanate-terminated polyurethane silicate prepolymer of Example 15 is mixed with about 5% by weight of water and cured to produce a solid polyurethane silicate product.

Other curing agents may be used in place of water such as aqueous sodium silicate, water containing silica sol, water containing 20% to 70% by weight of a water-binding agent, water containing 5% to 40% by weight of a colloidal dispersion of magnesium oxide and mixtures thereof.

EXAMPLE 17

About 100 parts by weight of the isocyanate-terminated polyurethane silicate prepolymer produced in Example 15, 1 part by weight of triethylamine, 1 part by weight of a foam regulator (water-soluble polyester siloxane), 10 parts by weight of a polyethylene triol (mol. wt. 2,000) and 10 parts by weight of methylene chloride are thoroughly mixed and the mixture expands to produce a rigid foamed polyurethane silicate product.

EXAMPLE 18

About 4 parts by weight of the broken-down alkali metal plant silicate polymer as produced in Example 2(b), 2 parts by weight of an aqueous solution containing 37% formaldehyde, 1 part by weight of phosphoric acid and 2 parts by weight of epichlorohydrin are added to an autoclave; then heated to a temperature just below the boiling point of epichlorohydrin at 15 psi while agitating for 30 to 90 minutes, thereby producing a polyhydroxy aldehyde lignin-cellulose silicate polymer and sodium phosphate.

Other aldehydes may be used in place of formaldehyde such as acetaldehyde, butyl aldehyde, chloral, acrolein, furfural, benzaldehyde, crotonaldehyde, propionaldehyde, pentanals, hexanals, octanals and their simple substitution products, semi-acetate and full acetals, paraformaldehyde and mixtures thereof. Compounds containing active aldehyde groups such as hexamethylene tetramine, phenoplasts and aminoplasts may also be used.

EXAMPLE 19

About 4 parts by weight of the broken-down alkali metal plant silicate polymer is produced in Example 1(l), 1 part by weight of crotonaldehyde, 2 parts by weight of epichlorohydrin, 1 part by weight of concentrated hydrochloric acid and 0.5 part by weight of propylene oxide are mixed, then heated to a temperature just below the boiling temperature of epichlorohydrin or propylene oxide while agitating for 30 to 90 minutes, thereby producing polyhydroxy aldehyde lignin-cellulose silicate polymer and sodium chloride.

EXAMPLE 20

About 3 parts by weight of the broken-down alkali metal plant silicate polymer as produced in Example 2(c), 1 part by weight of a liquid formaldehyde phenol resin produced in the presence of an acidic catalyst and containing free aldehyde radicals, 1 part by weight of concentrated hydrochloric acid and 3 parts by weight of epichlorohydrin are mixed, then heated to just below the boiling temperature of epichlorohydrin while agitating for 30 to 90 minutes, thereby producing polyhydroxy lignin-cellulose silicate polymer.

EXAMPLE 21

About 100 parts by weight of the polyhydroxy aldehyde lignin-cellulose silicate polymer produced in Example 19 and 100 parts by weight of a compound containing at least two isocyanate groups listed below are mixed and reacted at ambient temperature and pressure, thereby producing a solid polyurethane product.

| Example | Polyisocyanates |
|---|---|
| a | Tolylene diisocyanate; |
| b | Polyphenylpolymethylene-isocyanates with an NCO content of about 31%; |
| c | Naphthalene-1,5-diisocyanate; |
| d | Hexylene-1,6-diisocyanate; |
| e | Methylene bis-phenyl diisocyanate; |
| f | Crude toluene diisocyanate with an NCO content of about 18%; |
| g | Tolylene diisocyanate reacted with 5% acetic acid; |
| h | Polyphenylpolymethylene-isocyanates reacted with 1% propylene glycol; |
| i | Tolylene diisocyanate reacted with 10% silicic acid. |

EXAMPLE 22

Example 21 is modified by adding 15 parts by weight of trichlorofluoromethane, 1 part by weight of triethylenediamine, 0.2 part by weight of tin acetate, and 1 part by weight of a foam regulator (a water-soluble polyester siloxane) with the polyhydroxy aldehyde lignin-cellulose silicate polymer, thereby producing a rigid, foamed polyisocyanate silicate product.

EXAMPLE 23

About 100 parts by weight of the polyhydroxy lignin-cellulose silicate polymer produced in Example 4 and 50 parts by weight of phthalic anhydride are mixed, then heated to a temperature just below the boiling temperature of phthalic anhydride while agitating at ambient pressure for 30 minutes to 4 hours, thereby producing a polyester lignin-cellulose silicate polymer.

EXAMPLE 24

About 100 parts by weight of the polyhydroxy lignin-cellulose silicate polymer produced in Example 5, 25 parts by weight of phthalic anhydride, 10 parts by weight of adipic acid and 25 parts by weight of maleic anhydride are mixed, then heated at ambient pressure to just below the boiling temperature of the reactants, then the temperature is gradually increased to 250° C. while agitating for 30 minutes to 4 hours, thereby producing a solid polyester lignin-cellulose silicate polymer.

EXAMPLE 25

About 100 parts by weight of the polyhydroxy aldehyde lignin-cellulose silicate polymer produced in Example 18, 25 parts by weight of phthalic anhydride, 10 parts by weight of linseed oil and 25 parts by weight of succinic acid anhydride are mixed, then heated at ambient pressure to just below the boiling temperature of the reactants, then the temperature is gradually increased to about 250° C. while agitating for 30 minutes to 4 hours, thereby producing a solid polyester lignin-cellulose silicate polymer.

Other polymerizable oils may be used in place of linseed oil such as soybean oil, cottonseed oil, tung oil, fish oil, perilla oil, oiticica oil, perilla oil, sunflower oil, safflower oil, walnut oil, dehydrated castor oil, monoglyceride of vegetable oils and mixtures thereof.

Although specific conditions and ingredients have been described in conjunction with the above Examples of preferred embodiments, these may be varied, and other reagents and additives may be used, where suitable, as described above, with similar results.

Other modifications and applications of this invention will occur to those skilled in the art upon reading this disclosure. These are intended to be included within the scope of this invention, as defined in the appended claims.

I claim:

1. The process for the production of polyhydroxy lignin-cellulose silicate polymers by mixing and reacting the following components:
   (a) a broken-down alkali metal plant silicate polymer produced by heating a mixture of 3 parts by weight of a lignin cellulose-containing plant and 1 to 2 parts by weight of an oxidated silicon compound with 2 to 5 parts by weight of a melted alkali metal hydroxide to between 150° C. and 220° C. while agitating for 5 to 60 minutes; in an amount of 100 parts by weight;
   (b) an epoxide compound selected from the group consisting of alkylene oxide, epihalohydrins, styrene oxide, tetrahydrofuran and mixtures thereof; in an amount of 1 to 300 parts by weight;
   (c) a Lewis acid; in an amount wherein the pH of the mixture of Components (a), (b) and (c) is 5 to 6.

2. The process of claim 1 wherein the Lewis acid is a mineral acid selected from the group consisting of hydrochloric acid, sulfuric acid and phosphoric acid.

3. The product produced by the process of claim 1.

4. The process of claim 1 wherein an additional step is taken wherein 100 parts by weight of the polyhydroxy lignin-cellulose silicate polymer are mixed and reacted with 1 to 50 parts by weight of a polycarboxylic acid and up to 50 parts by weight of a polycarboxylic acid anhydride, thereby producing a polyester resin.

5. The process of claim 4 wherein the polycarboxylic acid is selected from the group consisting of aliphatic, cycloaliphatic, aromatic and heterocyclic polycarboxylic acids and mixtures thereof.

6. The process of claim 4 wherein the polycarboxylic acid anhydride is selected from the group consisting of phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid anhydride, and mixtures thereof.

7. The product produced by the process of claim 4.

8. The process of claim 1 wherein 1 to 100 parts by weight of an aldehyde are added to Components (a), (b) or (c) of claim 1.

9. The product produced by the process of claim 8.

10. The process of claim 8 wherein the aldehyde is selected from the group consisting of formaldehyde, acetaldehyde, propionic aldehyde, furfural, crotonaldehyde, acrolein, butyl aldehyde, paraformaldehyde, pentanals, hexanals, heptanals and mixtures thereof.

* * * * *

UNITED STATES PATENT AND TRADEMARK OFFICE
CERTIFICATE OF CORRECTION

PATENT NO. : 4,382,136
DATED : May 3, 1983
INVENTOR(S) : David H. Blount

It is certified that error appears in the above-identified patent and that said Letters Patent is hereby corrected as shown below:

The term of this patent subsequent to May 11, 1999, has been disclaimed.

Signed and Sealed this

Twenty-eighth Day of June 1983

[SEAL]

Attest:

Attesting Officer

GERALD J. MOSSINGHOFF
Commissioner of Patents and Trademarks